United States Patent Office 2,781,996
Patented Feb. 19, 1957

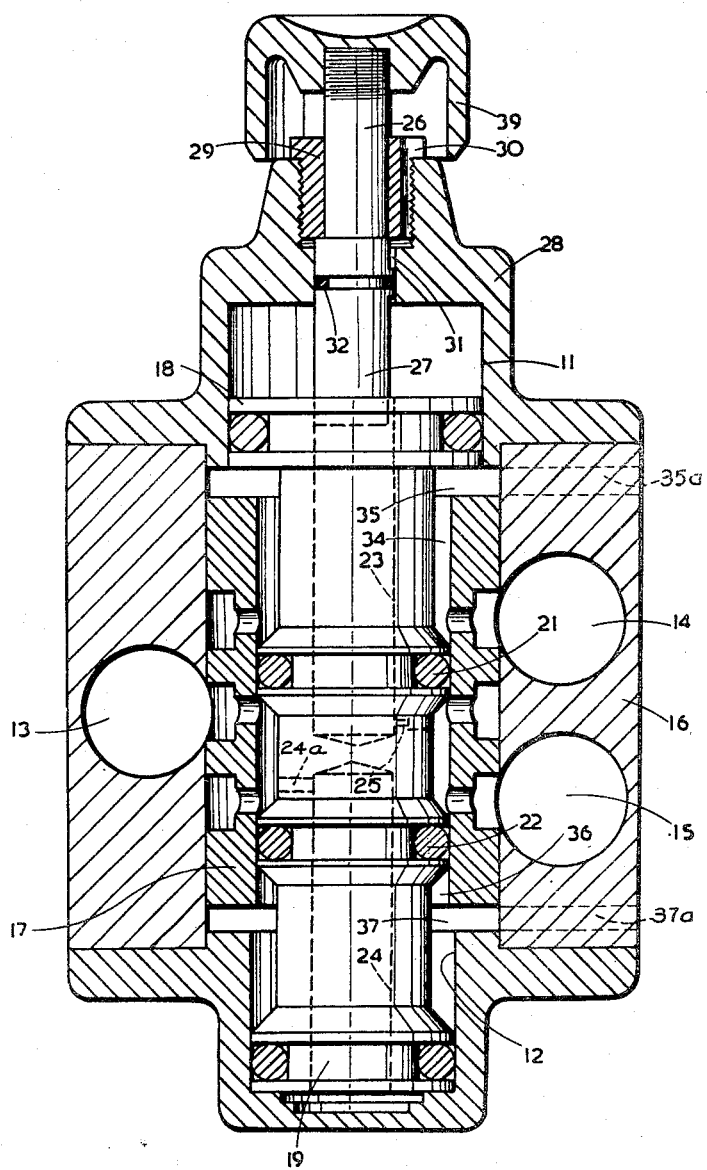

2,781,996

MANUALLY OPERABLE PNEUMATIC VALVES

Cosby Donald Philipps Smallpeice, Swanwick Shore, near Southampton, England

Application November 18, 1953, Serial No. 392,794

Claims priority, application Great Britain May 21, 1953

3 Claims. (Cl. 251—31)

This invention relates to a pneumatic valve of the kind having a body with a passage therein supplied with main pressure, a piston movable axially in a bore of the body to control the supply of main pressure from the passage, and a cylinder chamber at one end of the piston to receive the main pressure supplied along an axial bore of the piston through a restriction such that the piston can move towards this chamber from its normal position if the pressure can leak from the chamber more rapidly than the pressure is supplied thereto past the restriction.

It will be understood that the piston should be biassed to its end position away from the cylinder chamber, i. e., to its normal position. Thus, at the other end it may have a spring acting on it to bias it towards the chamber, the full pressure in the chamber however pre-ponderating over the spring bias. Alternatively, there may be a cylinder chamber, also supplied with the main pressure, at the other end of the piston in place of the spring, in which case the chamber supplied through the restriction should be of larger effective diameter than the chamber at the other end. Other means are available, however, for biasing the piston as aforesaid.

It may also be added that the invention is not limited to a valve having a single outlet port which is connected to the main pressure or to exhaust dependently upon the position of the piston. The valve may have, for example, two outlet passages connected by the piston in its different axial positions to the main pressure passage, the other of the outlet passages being connected to exhaust. Here, again, other arrangements of valve are possible.

With the kind of valve to which the invention relates, in order to prevent the loss of main pressure when the leak has been opened and the piston has responded as aforesaid, it is known to make the piston obstruct the leak or escape port when it reaches the end of the cylinder chamber first-mentioned.

The main object of the invention is to provide a valve having improved means for preventing waste of main pressure once the leak has been opened and the piston has responded accordingly.

According to the invention, a controllable plunger element, which is adapted to extend into the chamber first-mentioned and to enter the adjacent end of the supply bore in the piston with clearance, serves, when moved from its normal position, to open an effective leak from this chamber whereby the piston can move towards that end from its normal position, whereupon the plunger element makes a seal in the adjacent end of the supply bore of the piston, thus preventing the further escape of pressure from the chamber; whereas the plunger element, when again returned to its normal position, seals the leak from the chamber and removes the seal from the supply bore thereby to enable the piston again to move to its first position.

For carrying out the invention, in the case where there are cylinder chambers at both ends of the piston supplied with the main pressure as aforesaid, the piston may have a supply bore formed in two axially-spaced parts communicating with the respective chambers and each continuously supplied from the passage carrying the main pressure, though the part of the supply bore leading to the first-mentioned cylinder chamber contains the aforesaid restriction.

The leak is conveniently arranged to be where the plunger element enters the valve body, the plunger element preferably being provided with a sealing ring which normally prevents the escape of pressure from the cylinder chamber first-mentioned through this leak, and which, when the plunger element is moved from its normal position, makes a seal with the supply bore of the piston as the latter moves against its bias.

The single figure of the accompanying drawing illustrates an arrangement of pneumatic valve, according to the invention, in which there are cylinder chambers at both ends of the piston, and which is adapted selectively to connect the main pressure passage with either of two outlet passages dependently upon the position of the piston, the other outlet passage being connected to exhaust.

One of these cylinder chambers, namely, that referred to above as the first-mentioned, is indicated at 11, and the cylinder chamber at the other end is indicated at 12. 13 represents the passage carrying the main pressure, and 14, 15 the two outlet passages. These passages are formed in a body 16 of the valve provided with an axially-located ported liner 17. The piston has two piston elements 18, 19 adapted to work in the cylinder chambers 11 and 12 respectively, and, between its ends, two sealing rings 21, 22 which are axially spaced from one another.

There are also supply bores in the piston, for the respective cylinder chambers, which are indicated at 23 and 24. The former of these supply bores, 23 is fed with the main supply of pressure through a restriction 25, but the latter, 24, is fed through a larger passage 24a.

The piston is shown in its normal position, and also the plunger element 26, this latter having a stem 27 which extends through the cylinder chamber 11 into the supply bore 23 with adequate clearance. The ends of the valve body are closed by end members providing the cylinder chambers 11, 12, and the end member 28 has a screwed bush 29 in it alongside which the aforesaid leak 30 is provided, this leak communicating with a flat or grove 31 formed as shown on or in the plunger element. When the latter is in its normal position, the leak is sealed by a sealing ring 32.

With the piston in its normal position, it will be observed that the valve connects the main pressure passage with the outlet passage 15, the outlet passage 14 being placed to exhaust along the passages 34, 35 and 35a. When the piston is fully raised, the outlet passage 15 is connected to exhaust along the passages 36, 37, and 37a and the outlet passage 14 is placed in communication with the air pressure in the supply passage 13.

The piston is biassed to the position shown by the pressure differences applied to the adjacent faces of the piston elements 18 and 19, the effective area of the cylinder chamber 11 exceeding that of the cylinder chamber at the other end.

To effect operation of the valve, the head 39 of the plunger element is depressed to carry the sealing ring 32 into the interior of the cylinder chamber 11 and thus establish the above-traced leak. Depending upon the relative sizes of the leak passage and the restriction 25, the pressure in the chamber 11 will, in due course, fall to a point at which the piston will move upwardly. When it reaches the end of its upward travel the sealing ring 32 will enter the adjacent end of the supply bore 23 and provide a seal therewith, thus preventing any further escape of air pressure along the leak passages.

When it is desired to operate the piston to its initial or normal position, the plunger element is returned to its normal position shown in the drawings, in which it removes the seal from the supply bore 23 and re-establishes it to seal the leak.

Thus, the invention provides a very simple means of controlling the leak. An important advantage of the invention is that when the plunger element is depressed the corresponding upward movement of the piston, as its supply bore 23 engages the seal 32, can be felt, indicating that the valve has actually functioned.

What I claim as my invention and desire to secure by Letters Patent of the United States is:

1. A pneumatic valve comprising a body with a passage therein to which a gaseous fluid may be supplied, a piston movable axially in a bore of the body to control the supply of gaseous fluid from said passage, said body providing a cylindrical chamber at each end of said piston, one of said chambers being of larger diameter than the other, separate bores in said piston providing communication between said passage and said chambers, respectively, the bore leading to said larger chamber incorporating a restriction, and a controllable plunger element adapted to close and open a leak from said larger chamber, said plunger element adapted when moved to open said leak to extend into the adjacent end of the bore leading to the said larger chamber and to subsequently make a seal therewith when the piston end moves into said larger chamber.

2. A pneumatic valve comprising a body with a passage therein to which a gaseous fluid may be supplied, a piston movable axially in a bore of the body to control the supply of gaseous fluid from said passage, said body providing a cylindrical chamber at one end of the piston, the piston having a bore in it providing communication between said passage and said chamber through a restriction, means for biassing the piston to said one end, a controllable plunger element associated with this end of the body, said plunger element having an end adapted to enter said bore with clearance and carrying a sealing member spaced from said end, said body having a leak from said chamber, said sealing member sealing said leak in one position and making a seal with the bore of the piston when moved to its other position and when approached by the piston.

3. A pneumatic valve, according to claim 2, in which said leak is arranged in the body where the plunger element enters the body.

References Cited in the file of this patent
UNITED STATES PATENTS

| | | |
|---|---|---|
| 624,890 | Batchelor | May 9, 1899 |
| 996,346 | Keen | June 27, 1911 |
| 2,672,887 | Tipton | Mar. 23, 1954 |